United States Patent [19]

Daharsh

[11] 4,174,589
[45] Nov. 20, 1979

[54] BATHROOM PLANTER BOX

[76] Inventor: Lonnie J. Daharsh, 6227 Shadybrook La., Dallas, Tex. 75206

[21] Appl. No.: 846,437

[22] Filed: Oct. 28, 1977

[51] Int. Cl.² .............................................. A01G 9/02
[52] U.S. Cl. .............................................. 47/66; 4/1; 4/300; 4/353; 47/79
[58] Field of Search ................... 4/1, 300, 353; 47/79, 47/39, 66; D11/144, 143; D23/66

[56] References Cited

U.S. PATENT DOCUMENTS

| | | | |
|---|---|---|---|
| 1,133,735 | 3/1915 | Malone et al. | 47/79 |
| 1,570,841 | 1/1926 | Karnatz | 47/79 X |
| 1,701,682 | 2/1929 | Lawton | 4/353 |
| 1,835,540 | 12/1931 | Tilden | 4/1 |
| 1,936,008 | 11/1933 | Cowan | 4/353 |
| 2,003,006 | 5/1935 | Michelson | 4/353 |
| 2,099,932 | 11/1937 | Isaacson | 4/353 |
| 2,188,875 | 1/1940 | Ellis | 47/79 |
| 2,278,991 | 4/1942 | Hasslacher et al. | 47/79 X |
| 2,782,562 | 2/1957 | Watkins | 47/79 |
| 3,066,445 | 12/1962 | D'Amico | 47/39 UX |
| 3,095,670 | 7/1963 | Raab | 47/79 X |
| 3,314,080 | 4/1967 | Shilling, Jr. | 4/353 X |
| 3,772,827 | 11/1973 | Ware | 47/39 |
| 3,879,768 | 4/1975 | Murphy | 4/1 |

FOREIGN PATENT DOCUMENTS 1281145  11/1961  France .............................................. 4/1

*Primary Examiner*—Edgar S. Burr
*Assistant Examiner*—Steven A. Bratlie
*Attorney, Agent, or Firm*—Crisman & Moore

[57] ABSTRACT

A planter box for bathrooms is provided wherein a specially adapted planter structure is constructed for positioning atop the flush tank of conventional commodes in place of the cover therefor. The box includes drainage ports depending from the lower portion thereof for fluid flow communication into the commode tank. The box is constructed to matingly mount atop the commode tank to serve as a lid therefor. The drainage ports thereof are provided with a mesh screen or the like and a replaceable filter to prevent the transfer therethrough of the soil and related material housing the plants therein. A small hand pump is provided in conjunction with the planter box to siphon water from within the commode tank for being dispersed upon the plants within the box. In this manner, selected plants may be displayed and cared for in the bathroom without concern of transferring water thereto and/or the drainage therefrom.

3 Claims, 4 Drawing Figures

BATHROOM PLANTER BOX

BACKGROUND OF THE INVENTION

The invention relates to planter boxes, and, more particularly, to a planter structure adapted for mounting atop the flush tank of a conventional commode.

It is generally the practice in caring for plants in the home to provide same in an area in which the beauty of the plants may be appreciated. In many instances such locations are selected for aesthetic purposes only. Many times the drainage from the plant due to watering thereof is deleterious to the area upon which the plant is situated. In cases of furniture and the like, the water drained therefrom and not confined to the plant container may seriously damage the supporting furniture. For this reason, plants are often removed to the bathroom area or out-of-doors for watering thereof and left in such locations until sufficient drainage has occurred. It is thus customary to provide plants in containers having drainage ports which ports are disposed within saucer-shaped members for retaining drained fluid therefrom. In this manner such containers may be situated throughout the home and/or the areas where desired.

A current trend in the horticultural society of housewives and the like is to provide plants in heretofore unlikely areas for purposes of conversation and aesthetics. For example, plants are conventionally hung from ceilings and racks within the kitchen and bathrooms of homes and disposed over televisions, sinks and furniture areas. In addition, homes are being built with planter areas encircling bathtubs. The widespread usage of such displays and the numerous numbers of plants in homes has necessitated certain plant care provisions of which several prior art structures are addressed. For example, apparatus has been provided for housing plants and the like in containers adapted for the automatic watering thereof. Likewise, soil moisture content indicators have been provided for determining when such plants need to receive water. And finally, very long and narrow indoor hoses have been provided with plant care spigots on the end thereof while on the other end means for attaching the hose to conventional home water faucets. In this manner, plants may be watered through the extension hose in place of carrying water containers. Such methods and apparatus are advantageous in most instances and address most problems except the drainage from the plants themselves.

It would be an advantage to provide apparatus which would eliminate the above plant care problems associated with disposing plants within the household, at least for certain plants as provided herein. The present invention is adapted just for such a purpose, wherein a planter box is constructed for mounting upon the commode flush tank of conventional commodes to permit complete plant care in conjunction therewith. In this manner, such plants disposed within the present invention need not be removed for watering and/or other plant care as suitable drainage and water supply is permitted directly from the aforesaid commode flush tank.

SUMMARY OF THE INVENTION

The invention relates to apparatus for use in bathrooms for the housing of plants and the care of said plants which apparatus includes a planter structure adapted for secured positioning atop the flush tank of a conventional commode. In particular, the planter box is adapted for replacing the conventional commode tank cover and being disposed in communication with the water within the commode tank. The planter box includes four generally planar sides having lower portions thereof adapted for secured mating with the top of conventional commode tanks for generally horizontal positioning thereover. A lower bottom section of the planter box is provided in a downwardly tapering configuration terminating in at least one drainage aperture for providing drainage of water supplied to the plants. A mesh screen and a replaceable filter plug may be provided across the drainage aperture to prevent the transfer of the soil contained within the planter box into the commode.

In another aspect the invention includes a planter box formed of plastic, wood or molded material which is adapted for secured positioning over the flush tank of the commode for housing plants therein. Siphon means are provided for depending from the planter box into communication with the commode tank water thereto neath while pump means are provided adjacent the planter box for pumping water from the commode tank and providing same to the plants. In addition support means are provided upon the planter box in conjunction with the structural configuration thereof for housing an ultra-violet light, or the like, to provide proper light sources to the plant during its stay atop the commode for plants needing it.

BRIEF DESCRIPTION OF THE DRAWINGS

For a more complete understanding of the present invention and for further objects and advantages thereof, reference may now be had to the following description taken in conjunction with the accompanying drawings, in which.

DETAILED DESCRIPTION OF THE DRAWINGS

Figures 1, 2, 3, 4:
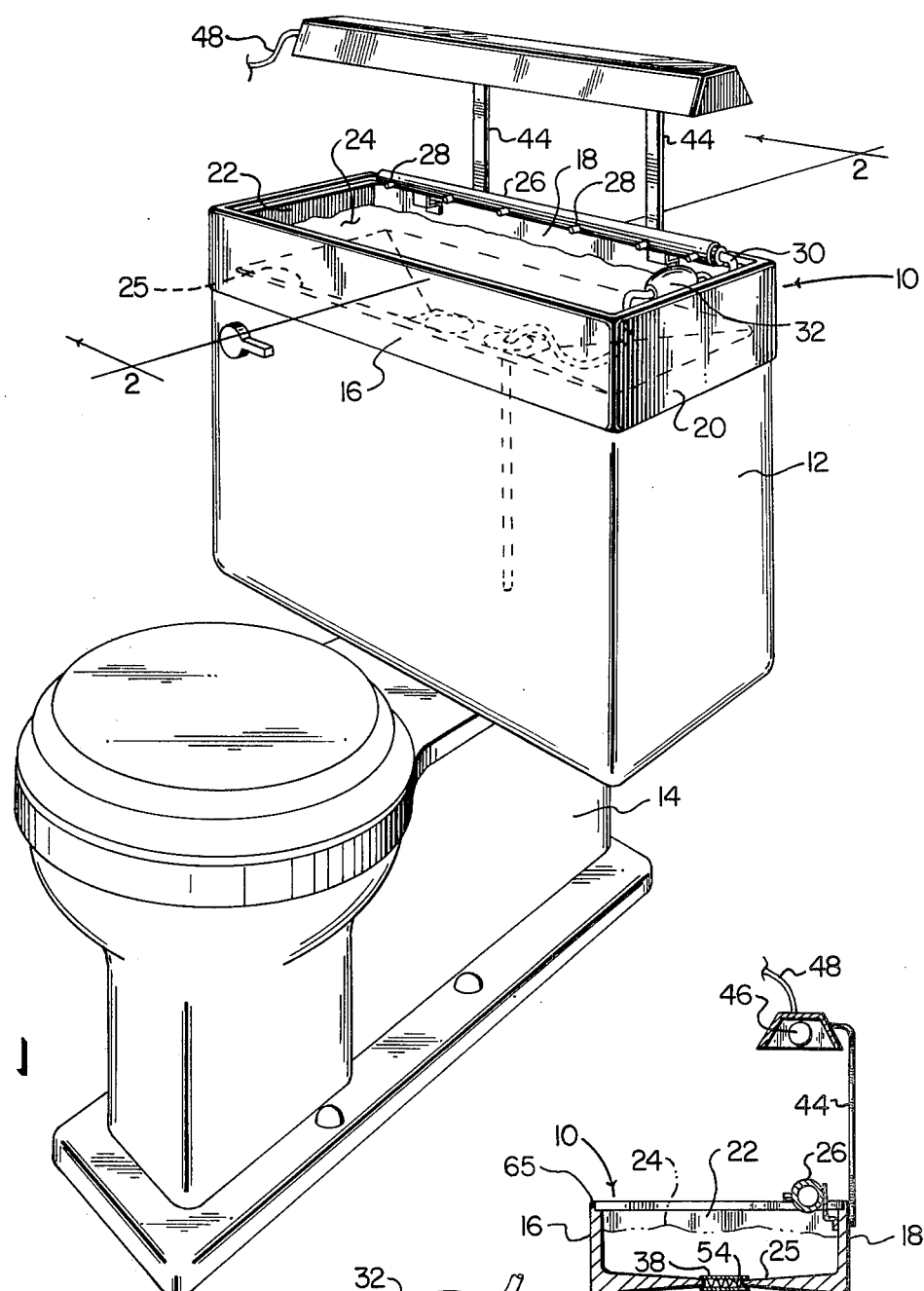
FIG. 1 is a perspective view of one embodiment of a planter box constructed in accordance with the principles of the present invention and positioned over a flush tank of a conventional commode.
FIG. 2 is an enlarged, side elevational, cross-sectional view of the commode tank of FIG. 1, taken along lines 2—2 thereof and illustrating the cross-sectional configuration of the planter box of FIG. 1.
FIG. 3 is an enlarged fragmentary perspective view of the drainage and water supply means constructed in the planter box of FIG. 1.
FIG. 4 is a fragmentary perspective view of an alternative embodiment of the planter box of FIG. 1.

Referring first to FIG. 1 there is shown a planter box 10 disposed atop a conventional commode tank 12 of the type having a lower toilet bowl structure 14. The planter box 10 of this particular embodiment includes a generally vertical upstanding frontal wall 16 and back wall 18 joined by side walls 20 and 22 secured therebetween. The planter box 10 is constructed for holding soil 24, or the like, for supporting plant life therein. A tapered bottom portion 25, shown in phantom in this illustration, is provided in the planter box 10 for retaining the soil 24 thereabove in a configuration facilitating drainage of water therefrom through a drainage port provided therein.

Still referring to FIG. 1 there is shown an elongated tubular member, or conduit 26 extending along the back wall 18 for providing means for watering the plants within the box 10. The conduit 26 includes a plurality of spray ports 28 disposed longitudinally therealong for dispersing water onto the soil 24. A flexible hose 30 is provided for flow communication between the conduit 26 and the water within the commode tank 12. A hand-operated pump bulb 32 is provided in line with the hose 30 for facilitating the drawing of water from the commode tank 12 into the planter box 10. The pump 32 as shown in FIG. 1 is comprised of a hand-held flexible bulb having a one-way valve constructed therein and of the type conventionally available for pumping fluids through an inline connection. In this manner watering of the vegetation provided within the planter box 10 is greatly facilitated and the concern of supplying water and/or drainage thereto virtually eliminated.

Referring now to FIG. 3, there is shown a lower drainage port 34 disposed through a base section 36 of the bottom portion 25 of the planter box 10. A screen 38 comprised of wire mesh is disposed thereacross to retain the soil 24 housed within the planter box. Screen 38 prevent the transfer of the soil 24 through the aperture 34 of the planter box during watering of the plants housed therein. The watering operation is facilitated by the pump member 32 shown to be provided in communication with the commode tank 12 through a passage 40 formed in the base 36 of the planter box 10 for permitting the drawing of water therethrough. The particular configuration of the pump 32 and tube 30 is shown for purposes of illustration and it should be noted that any conventional pump or siphoning configuration facilitating transfer of the water from the commode tank may be utilized.

Referring now to FIG. 2, there is shown a cross-sectional, side elevational view of the planter box 10 and commode tank 12 of FIG. 1. The conduit 26 is shown disposed across the rear edge 18 adjacent vertical brackets 44 upstanding from the rear wall 18 of the planter box 10, for housing a plant light 46 thereacross. In this manner, plant growth and development within the planter box is facilitated. Energy to the light 46 is provided via an electrical cord 48 shown connected thereto. As also shown in FIG. 2, depending flanges or lips 50 are preferably provided across the bottom of the planter box for engaging the side faces of the commode tank 12 to provide secured positioning thereatop. It may be seen that in certain commode tank configurations the relative positions of the lips 50 may be varied in a conventional manner to permit adaptation to all commode tank configurations.

In operation water is provided to the conduit 26 and the soil 24 from the commode tank 12 therebelow. Drainage therefrom is provided through the aperture 34 in the bottom portion of the planter box 10 in a manner to prevent most of any drainage soil 24 from reaching the water within the commode tank 12. To facilitate this result, a filter plug is provided within the aperture 34, as illustrated in FIG. 2. A second screen element 52 is therefore shown across the bottom opening of the aperture 34 for retaining a layer of filter material 54 thereabove. The filter material 54 may be comprised of angel hair, cotton or the like for filtering out soil particles passing through the upper screen 38. In this manner the filter can be removed by pulling the screen 52 and filter material 54 downwardly from the aperture 34 and replacing same in a conventional fashion. Likewise, the filter and filter screen may be retained within the aperture 34 by a detent means incorporated therein.

Referring now to FIG. 4, there is shown one of several possible alternative embodiments of the planter box 10 of FIG. 1, wherein two adjacent plant areas 60 and 62 are provided in a configuration segregating one from the other. In this manner plants requiring different moisture levels can be cared for in a side-by-side fashion. Likewise, a tray or shelf area 64 may be provided between the adjacent plant compartments 60 and 62 for the convenience of bathroom patronage. In this configuration the spray bar watering conduit 26 is constructed for providing water in a segregated manner to the two plant compartments 60 and 62. It should be noted that various combinations of shelf or tray space and/or planter compartments not otherwise shown herein may be constructed within a planter box 10 while remaining within the spirit and scope of the present invention. For example, a single compartment 60 may be provided adjacent a shelf or tray covering the surface area of the shelf 64 and plant compartment 62 of FIG. 4. In addition, a glass or plastic dome cover 63 may be added, as shown, to comprise a terrarium type planter box 10 seated within lips 65 upstanding around the top edge of said box, as shown in FIG. 2. In such an embodiment the dome cover may be provided in a configuration encompassing the light fixture 46, or disposed thereunder. Preferably the siphon bulb 32 is provided outside the side walls of the planter box 10 for purposes of watering the plants without removing the terrarium cover. In this manner, it is possible to provide total plant care within the bathroom without having to bring water to the plants or move the plants from the planter box 10 for the watering cycle. Finally, it should be noted that the term planter "box" is meant to encompass any structure adapted for containing plants atop a commode flush tank as described herein, and other geometrical constructions not shown herein are contemplated.

It is thus believed that the operation construction of the above-described invention will be apparent from the foregoing description. While the bathroom planter box shown and described has been characterized as being preferred, it will be obvious that various changes and modifications may be made thereto without departing from the sprirt and scope of the invention as defined in the following claims.

What is claimed is:

1. A bathroom planter box for receiving soil and housing plants and vegetation within a bathroom upon an open top flush tank of a conventional commode and being in fluid-flow communication therewith for facilitating the watering of said plants and providing for drainage into said flush tank, said planter box comprising:

an elongated housing received within and upstanding from the open top of said flush tank and including four generally upstanding side walls each of said side walls having a lower peripheral portion matingly engaging the top region of said flush tank in secured engagement thereon;

a base portion forming the bottom surface of said housing, said base portion comprised of at least two surfaces slanted one toward the other with a drainage aperture provided therebetween for facilitating the flow of water witin said housing and the drainage therefrom directly into said flush tank;

filter means disposed within said drainage aperture for restricting the transfer of particles of soil therethrough and into said flush tank and comprising a screen affixed across said aperture;

apparatus for providing fluid flow communication between said housing and said flush tank for watering the vegetation cared for within the housing, said apparatus including a tube extending from said housing in depending communication with the water within the flush tank therebelow;

pump means provided in inline communication with said tube for pumping water through said tube and dispersing same upon the vegetation disposed within said planter box and maintaining said fluid flow communication with said flush tank; and means securing said elongated housing atop said flush tank including at least two lips depending from said side walls of said housing for engaging the inside side walls of said flush tank whereby secured positioning and fluid communication between said flush tank and said elongated housing is affected.

2. The planter box set forth in claim 1 wherein said planter box further includes a pair of upstanding supports and a light fixture secured thereacross in generally horizontal positioning for the transmission of ultra-violet light necessary for plant life of certain varieties.

3. The planter box as set forth in claim 1 wherein said box is divided into at least two separate compartments for the division of plant maintenance therebetween, each compartment having segregated means for drainage of fluid therefrom into the commode tank therebelow.

* * * * *